(12) United States Patent
Webster et al.

(10) Patent No.: US 9,768,960 B2
(45) Date of Patent: Sep. 19, 2017

(54) METHOD FOR SERVER ASSISTED KEYSTORE PROTECTION

(71) Applicant: GEMALTO SA, Meudon (FR)

(72) Inventors: Michael Webster, La Ciotat (FR); Seppo Pohja, La Ciotat (FR); Timo Palo, La Ciotat (FR)

(73) Assignee: Gemalto SA, Meudon (FR)

( * ) Notice: Subject to any disclaimer, the term of this patent is extended or adjusted under 35 U.S.C. 154(b) by 7 days.

(21) Appl. No.: 14/650,676

(22) PCT Filed: Nov. 28, 2013

(86) PCT No.: PCT/EP2013/074998
§ 371 (c)(1),
(2) Date: Jun. 9, 2015

(87) PCT Pub. No.: WO2014/090590
PCT Pub. Date: Jun. 19, 2014

(65) Prior Publication Data
US 2015/0318992 A1     Nov. 5, 2015

(30) Foreign Application Priority Data
Dec. 10, 2012 (EP) .................................. 12306551

(51) Int. Cl.
*G06F 21/62*     (2013.01)
*H04L 9/08*     (2006.01)
*H04L 9/32*     (2006.01)

(52) U.S. Cl.
CPC ............. *H04L 9/0894* (2013.01); *H04L 9/08* (2013.01); *H04L 9/321* (2013.01); *H04L 9/3226* (2013.01); *H04L 9/3236* (2013.01)

(58) Field of Classification Search
CPC ...................................................... H04L 9/3226
See application file for complete search history.

(56) References Cited

U.S. PATENT DOCUMENTS 5,694,471 A    12/1997   Chen et al.
6,742,129 B1*   5/2004   Higgs ................... G06F 21/123
                                               380/202

(Continued)

OTHER PUBLICATIONS

International Search Report (PCT/ISA/210) mailed on Jan. 29, 2014, by the European Patent Office as the International Searching Authority for International Application No. PCT/EP2013/074998.

(Continued)

*Primary Examiner* — Josnel Jeudy
(74) *Attorney, Agent, or Firm* — Buchanan Ingersoll & Rooney LLP

(57) ABSTRACT

The present invention relates to a method to access a data store previously locked using a passphrase from a device. The method includes the following steps, when the user requests access to the data store: requesting the user to enter the personal code; generating an access code by applying a first function to at least the entered personal code; sending out, to the server, at least an identifier of the device and the access code; for the server, comparing the access code with the preliminary received first function; for the server, if the access code is correct, returning the passphrase to the device; and for the device, unlocking the data store using the received passphrase in combination with the entered personal code.

15 Claims, 1 Drawing Sheet

(56) References Cited

U.S. PATENT DOCUMENTS

| | | | |
|---|---|---|---|
| 7,149,311 | B2 | 12/2006 | MacKenzie et al. |
| 8,769,618 | B2 * | 7/2014 | Husemann ................ G09C 5/00 |
| | | | 713/155 |
| 2002/0023215 | A1 | 2/2002 | Wang et al. |
| 2002/0141594 | A1 | 10/2002 | MacKenzie et al. |
| 2004/0098585 | A1 | 5/2004 | Grove et al. |
| 2006/0085845 | A1 | 4/2006 | Davis et al. |
| 2007/0005963 | A1 * | 1/2007 | Eldar .................. G06F 21/6209 |
| | | | 713/168 |
| 2007/0239988 | A1 | 10/2007 | Atzmony et al. |
| 2010/0180328 | A1 * | 7/2010 | Moas ..................... G06F 21/34 |
| | | | 726/6 |

OTHER PUBLICATIONS

European Search Report issued May 23, 2013, by the European Patent Office in corresponding European Patent Application No. 12 30 6551.

* cited by examiner

METHOD FOR SERVER ASSISTED KEYSTORE PROTECTION

FIELD OF THE INVENTION

The present invention relates to a method to access a data store securely stored in a device while being assisted by a server with which the device can communicate as needed. Typically the invention applies in the field of the storage and recovery of keys in a non secure environment.

BACKGROUND OF THE INVENTION

Almost all cryptographic software relies, among other things, on storing secrets. Such software often assumes that the storage is persistent, and preserves the confidentiality of the secret. This is commonly achieved by using secure hardware such as a smart card as the storage media. Access to the secrets is then dependent on two factors: having access to the secure hardware—so called "what you have" factor—and knowing the right code such as a PIN that unlocks the access (the "what you know" factor). The code is typically just a few digits or characters long.

Cryptographic software that runs on personal computers, tablets, smart phones or similar unsecure devices has often to work without any secure hardware: Persistent storage is available but the available measures to preserve integrity and confidentiality of the secret are limited.

The invention at hand focuses on software running on such unsecure devices. A commonly used approach to implement two-factor cryptography on such a device is to store the secrets in a file called keystore, which is encrypted using a long passphrase. However, long passphrases are burdensome to use; the more burdensome the more limited keyboard capabilities the device has, especially without a "qwerty"-keyboard.

Using a PIN or other short passphrase would make the software more user-friendly but a brute-force attack on the encrypted file would become feasible. Typically, dictionary attacks can enable an attacker to access the content of the sensitive data store.

Another difference between unsecure devices and secure devices like smart cards is that copying a smart card along with the stored secrets is considered extremely difficult whereas copying a keystore from an unsecure device is usually considered quite feasible.

Thus, in general, unsecure devices cannot reliably provide two-factor cryptography because the core of the "what you have" factor—the keystore—can be cloned to other devices. After cloning, the keystore is no longer considered to be "what you have" but to be "what anyone might have". Furthermore, it may take a long time to detect that cloning has taken place or it may go totally unnoticed.

Relying on a server to access to sensitive data is known from U.S. Pat. No. 7,149,311. In this document are disclosed several server-based solutions, some relying on the use of a trusted server to store keys. In this case, sensitive data are sent to a device on the device's request.

This presents the drawback to permit the reception of the private key itself once the password is known. If the password is guessed or attacked, an attacker will obtain the key from the server and will be able to use it for unlimited time.

This document also describes a server based protocol where a part of the cryptographic calculations are realized by the server. As far as this server is secure, this increases the security in regards to the manipulation of sensitive data. Nevertheless this solution is not directly relevant in regards to offline dictionary attack and presents weaknesses similar to the ones of the previous solution.

More specifically, the invention described in U.S. Pat. No. 7,149,311 proposes to divide the key into shares and to use the server for the retrieval of one of the shares. For this purpose, the request of the device towards the server comprises cryptographic information included in the data stored in the keystore and previously generated from the key, i.e. a share of the key. Data protected in the keystore of this prior art are not any kind of data but shares of key. Such a keystore is not intended to include any kind of whole sensitive data that need to be protected. The server gives a partial assistance to extract the share then used in the device to recover the whole key. This solution implies computation inside the server and inside the device, preliminarily to the implementation and during the operation of the method.

SUMMARY OF THE INVENTION

The present invention aims at such purposes and is defined, in its broadest sense, as a method to access a data store previously locked using a passphrase from a device, said method including the preliminary steps of:

for the device, requesting the user to enter a personal code on the device;

for the device, calculating a first function of at least the personal code;

for the device, sending, for storage, said first function to a server knowing the passphrase;

said method further comprising the following steps, when the user request access to the data store:

for the device, requesting the user to enter the personal code, for the device, generating an access code by applying said first function to at least the entered personal code;

for the device, sending out, to the server, at least an identifier of the device and the access code;

for the server, comparing the access code with the preliminary received first function;

for the server, if the access code is correct, returning the passphrase to the device;

for the device, unlocking the data store using the received passphrase in combination with the entered personal code.

The invention relies on the server with which the device can communicate as needed. The communication can happen for instance over the Internet. The invention solves the problem of how short passphrases, the personal code, can be used on unsecure devices while maintaining the confidentiality of the secrets in the keystore. The user needs to have the keystore and to know the personal code. He/she needs it to request the passphrase and to unlock the keystore in combination with the received passphrase.

According to an advantageous feature:

before the preliminary calculation of the first function, a step of calculating and storing a checksum of the personal code;

each time the user enters a personal code, a step of calculating the checksum of the entered personal code;

a step of comparing the calculated checksum with the previously stored checksum, if there is a discrepancy, a step of displaying an error message, and, if the checksum is correct, processing the following steps of the method.

This feature assures that the entered PIN is never stored in the unsecure device but only checked using the checksum.

According to an advantageous embodiment of the invention, preliminary steps of generating a fixed random number and of storing it in the device, the first function being a function of the personal code and of the fixed random number.

The use of the fixed random number, not know by any other device, provides protection against the use of "rainbow tables" to deduce the user's personal code from the access code sent to the server.

Advantageously, the first function is a function of the sum of the personal code and the fixed random number.

Such an implementation is particularly simple as a single value, i.e. the sum, is provided to the function.

In an embodiment, the data store is previously encrypted and stored on the device.

In this embodiment, the keystore is stored on the unsecure device itself. The invention is particularly advantageous as it provides security in the unsecure environment.

In another embodiment, the data store is previously stored on a smart card, or similar secure element, having locked access and linked to the device.

With such an embodiment, it is necessary for the device to be able to welcome a smart card. The security is thus physically managed.

According to an advantageous feature, the method comprises, each time the user request access to the data store, a step of determining a one-time nonce sent out to the server with the access code.

The use of a one-time nonce checked by the server provides some capabilities for detection of cloning of the keystore. It also avoids replays of requests of the device as the content of the request is necessarily different from one request to the other. This feature enables to insure that the device is well the one that required the passphrase and that will receive it. It is useful for detecting the cloning of the keystore.

In a first embodiment of this feature, the one-time nonce is generated by the server and retrieved from the server by the device each time the user requests access to the data store, the server checking the nonce then received back from the device.

In a second embodiment of this feature, the one-time nonce is calculated in the device and linked to the previously sent one-time nonce for the server to check the sequence of one-time nonce.

According to a preferred embodiment, the method comprises a further step of, after the calculation of the access code, calculating a second function of the access code and of the nonce, a step of sending it to the server with the nonce and a step, for the server to verify the information sent by performing the same calculation as the device, using the access code and nonce.

In an embodiment, entering of the personal code is done by secure acquisition. This avoids easy retrieval of the PIN by malicious application that could be installed on the device.

In a particular embodiment, communications between the device and the server being secured, the device encrypts messages using a public key of the server.

This also avoids retrieval of data while sniffing the communications.

In this case, preferably, the server comprises a secure environment where the decryption of the messages occurs. This ensures that data remain secret from one side to the other.

According to a specific feature, communications between the device and the server being secured, the device sends a one-time used encryption key to the server that uses it to encrypt the sending of the message.

This feature enables to secure communication through one time usable key.

In an advantageous embodiment, the first function is a hashing function. Such functions are adapted to the purposes of the invention.

The present invention also relates to a device able to implement the method of the invention, said device having at least a data store previously locked using a passphrase, a personal code acquisition module, a calculation module able to generate an access code by applying a first function to at least the entered personal code, a transmitter to send out at least an identifier of the device and the access code towards a server knowing the passphrase for storage, a receiver to receive a passphrase from the server, an unlocking module to unlock the data store using the received passphrase in combination with the personal code entered by the user.

BRIEF DESCRIPTION OF THE DRAWINGS

Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
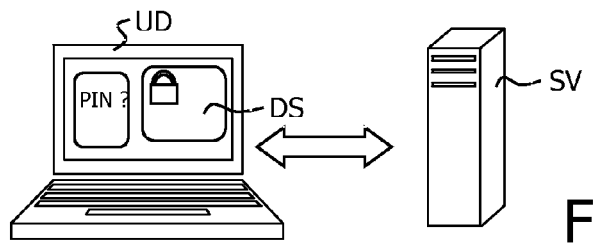
FIG. 1 represents the environment where the invention is advantageously implemented.

In the following detailed description, reference is made to the accompanying drawings that show, by way of illustration, specific embodiments in which the invention may be practiced. These embodiments are described in sufficient detail to enable those skilled in the art to practice the invention. It is to be understood that the following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar entity or functionality throughout the several views.

FIG. 1 schematically shows an unsecure device UD. This device UD is able to communicate with a server SV as needed. The communication can happen for instance over the Internet. The device has a store DS to store sensitive data in memory. This store DS typically stores keys. Such a keystore DS has typically been encrypted using what comes back from the server (a strong passphrase) and what's input by the user (the personal code). The invention applies to any locked store DS, wherein data can be encrypted. Several devices may use the same server SV. Advantageously, the server uses some secure environment, e.g., hardware security module (HSM), for storing any sensitive data and to carry out all the sensitive operations.

Communications between the device UD and the server SV is advantageously secured through one or more security mechanisms. It is thus possible for the device to encrypt all messages it sends to the server using the public key of the server, which then decrypts them in a local secure environment.

As part of each such message, the device advantageously sends an encryption key that the server uses for replying to the device. New key is advantageously generated every time. The key may be symmetric or asymmetric and in either case, the device uses the corresponding decryption key to decrypt the reply.

Figure 2:
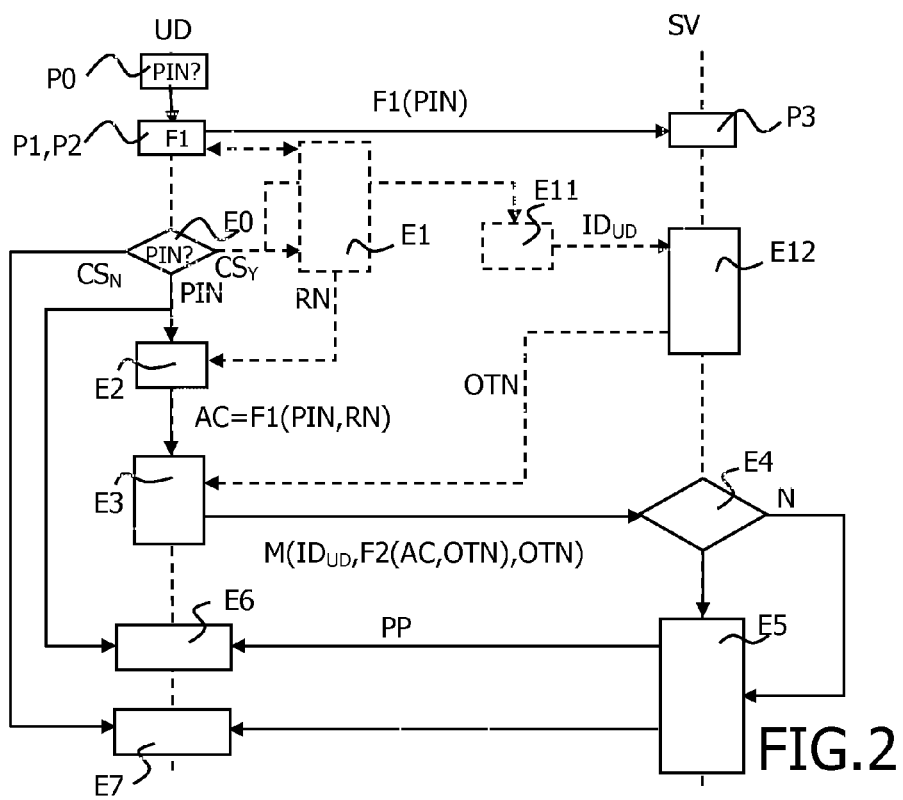
FIG. 2 shows a flow chart of a first embodiment of the method of the invention.

FIG. 2 shows a flow chart of a first embodiment of the method of the invention.

In a first preliminary step P0, the user is prompted to enter a personal code PIN. A first function F1 is then applied to said entered personal code PIN in a second preliminary step P1, the result of which being sent in a step P2 to a server SV for storage P3 of the received value F1 (PIN).

Each time the user of the device UD requests access to the keystore DS, in a first step E0, the user is prompted to enter his/her personal code, typically a Personal Identification Number (PIN in the following) or similar easy-to-use code into the device.

The PIN is not known by the device. Nevertheless, the device may have a checksum CS of the PIN in order to do a first check of it. In this case, if the checksum of the PIN is not correct ($CS_N$), a step E7 implies the key store DS remains locked.

In any one of the two cases, the PIN is transferred to a step E2 wherein an access code AC is calculated from at least the personal code PIN. For this purpose, a first function F1, advantageously a hashing, is applied to the personal code.

According to an advantageous embodiment shown in dotted line, a step E1 is performed. Step E1 consists in retrieving a fixed random number RN to feed step E2 of creating the access code AC by applying the first function F1 to the personal code PIN and the random number RN. Of course, in this advantageous embodiment, during the preliminary steps, the first function is also applied the personal code PIN and to the same random number RN previously generated and stored.

Advantageously, the sum of the personal code and the fixed random number RN is hashed to obtain the access code AC. The fixed random number is advantageously a salt code. Salt is a fixed random number that prevents an attacker from using a rainbow table to calculate the PIN from F1(PIN) (definition in Applied Cryptography, Bruce Shneier).

In a step E3, a message is prepared by the device UD including at least an identifier of the device (of course, this identifier can be included in the call itself) and the access code AC.

In a step E4, the server SV checks that the received access code AC was generated using the correct PIN.

In the case the received access code corresponds to the one previously received and stored at preliminary step P3 of the method.

In a first embodiment of an advantageous feature of the invention also shown in dotted line, step E11 consists in sending an identifier $ID_{UD}$ to the server SV. In a step E12, the server SV generates a one-time nonce OTN. The device UD receives said nonce OTN and includes it in a message with the device identifier $ID_{UD}$ and in a function F2 of the access code previously calculated and the nonce OTN $M(ID_{UD},F2(AC,OTN),OTN)$. Said function F2 is known from the server SV.

Then, the server SV checks in step E4 if the message from the device contains the right nonce OTN. If any other nonce is included, the server SV assumes that this is a replay attack and can launch a countermeasure. For instance, such a countermeasure can consist in sending a wrong passphrase.

Otherwise, the server SV calculates the function F2(AC, OTN) from the previously stored access code AC and from the received OTN. If the received data F2(AC, OTN) matches, it means that the access code AC used by the device for the calculation of F2 is correct, a passphrase PP is sent back to the device UD. In a step E6, the device UD unlocks the key store DS using a function of the passphrase PP and the PIN. The user can then access the keys stored in the store DS.

Figure 3:
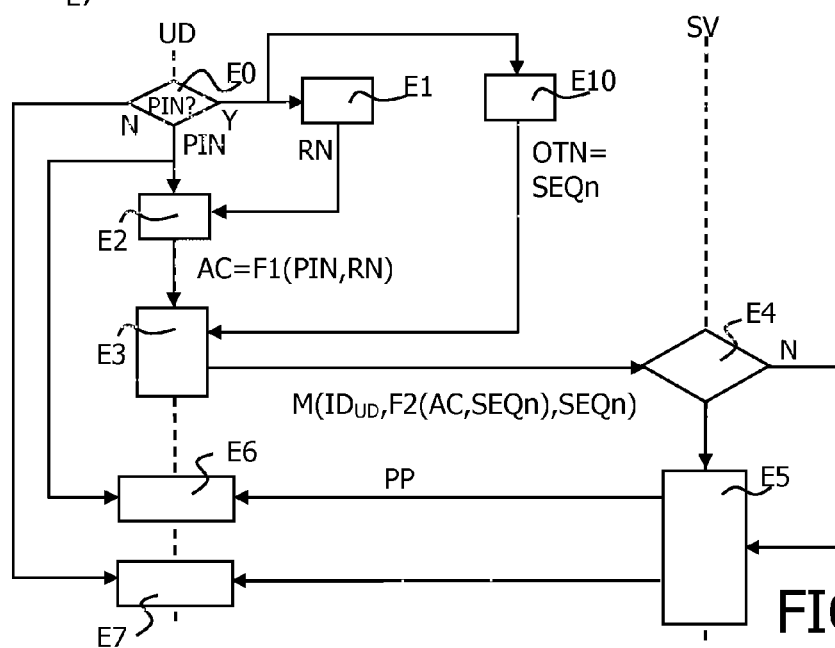
FIG. 3 shows a flow chart of a second embodiment of the method of the invention.

FIG. 3 shows a flow chart of a second embodiment of the previously exposed advantageous feature of the invention consisting in using a one-time password in the method of the invention. Preliminary steps are identical to the ones of FIG. 2 and this figure only shows the method after step E0, where the user requests access to the keystore DS.

After the first step EU where the user is prompted to enter his/her personal code, if the checksum CS of the PIN is not correct, the keystore remains locked in a step E7. The keystore can also being destroyed after a predetermined number of wrong attempts. If the checksum CS of the PIN is correct, two steps E1 and E10 are performed. Step E1 consists in generating and storing a fixed random number RN, or in retrieving it if it was previously generated, to feed the step E2 of creating an access code AC.

Step E10 consists, for the device UD, in generating a nonce OTN that is a sequence value SEQ. Typically the sequence value SEQn consists in an ever-increasing number, a timestamp or some other similar data.

Then, in a step E3, the device UD creates a message $M(ID_{UD},F2(AC, SEQn),SEQn)$ advantageously encrypted. It then sends it to the server SV. The server SV keeps record of the latest sequence value SEQn-1 that it has seen. Attempted replay attack would reveal itself because the sequence value would remain unchanged or jump backwards.

The access code AC is advantageously a Function, for example a hash, of F1(PIN,RN) of the personal code PIN and the fixed random number RN.

In a step E4, the server SV checks the correctness of the function F2 of the access code AC and the sequence value SEQn and the rightness of the sequence value SEQn in comparison with the previously received one SEQn-1.

The presence of the nonce in the two embodiments of the advantageous feature protects against replay by making unique the message sent by the device. This feature enables to detect cloning. To clone the device the attacker would need to copy at least the keystore and other features enabling the server not to be able to distinguish the original device and the clone device(s) from each other. However, active use of more than one device with the same device identifier will be detected by the server using the use of a one-time nonce and appropriate countermeasures can be started including but not limited to blocking all further use of the devices.

In a preferred embodiment, the device sends with each message a sequence value that reveals not only ordering of messages, enabling the reveal of replay attacks, but also the number of sequence values generated, i.e. whether two sequence values are adjacent, separated by one intermediate value, two values, three values etc.

Depending on the sophistication of the attack, two or more devices using the same device identifiers would reveal themselves by creating what would appear like a replay attack or by making the sequence value to jump forward in increments larger than could be explained by assuming that the server and the device lost synchronization due to an occasional communication failure.

The sequence value SEQn used for detecting cloning could, of course, be used also for detecting replay attacks if so desired. In any case it will cause countermeasures.

For instance, such a countermeasure can consist in sending a wrong passphrase.

Otherwise, if the access code AC and the nonce are correct, a passphrase PP is sent back to the device UD. In a step E6, the device UD unlocks the key store DS using the passphrase PP and the PIN. The user can then access the keys stored in the store DS.

Some additional security requirements can enable to counter various attacks. Security design principles will be applied. For instance, any secret that is in the working memory of the device must be overwritten as soon as it is no longer needed. PIN is never stored on the device and never communicated to the server. Instead, the access code is used and, in case of need, a checksum of the PIN inside the device. This protects confidentiality of the PIN.

The encrypted message sent by the device can only be decrypted/encrypted within a secure environment within the server. If the server or the communication line gets compromised, the attacker will not have access to the encrypted information. The secure environment, HSM for instance, is configured to reveal the passphrase associated with a given device identity only if the correct access code is used and all security checks have been successfully passed.

Advantageously, occurrences of incorrect access codes are recorded and when some predetermined limits are exceeded—e.g. 4 consecutive failed attempts or 10% of last 100 attempts have failed—additional countermeasures can be activated. For instance, the device may be locked out of the system altogether or the server might exponentially increase its response time to the device. This approach protects against brute force attacks where the attacker tries to guess the PIN even if the attacker has already learned the salt.

Furthermore, the server encrypts the message that contains the passphrase for the keystore within the secure environment and the device never stores neither the passphrase nor the decryption key in persistent memory thus protecting the confidentiality of the passphrase.

If an incorrect access code is encountered, the server may or may not tell device about this explicitly depending on the desired configuration. If the device is not told explicitly, the server would return an incorrect passphrase to the device. It would then be up to the device to detect that the passphrase is incorrect, if detecting at all.

Security is increased by using the passphrase from the server in combination with PIN from the end-user to unlock the keystore, rather than using the passphrase directly. This means that the server side does not possess all the information required to access the keys, giving inbuilt integrity to the system. The PIN and passphrase may be combined in a number of ways including concatenation, XOR and other mathematical operations. Other operations such as one-way functions may also be applied to the PIN or passphrase or any other intermediate result during the process.

The access code (AC) sent to the server can also be enforced by sending other personal data to the server, that may be the answer to a question like "what is your mother's maiden name" etc.

The invention enables to use short passphrases on unsecure devices for two-factor cryptography while maintaining the confidentiality of the secrets in the keystore. The personal code is what the user knows and cryptographic code corresponds to the device which is what the user has. The invention also provides a solution for detection of cloning of the keystore.

In any case, the invention does not imply circulation of any sensitive data encrypted or not. The keys are located only in the key store and except in case of cloning of the keystore, no access is possible for an attacker.

The scope of the present invention is defined only by the appended claims, appropriately interpreted, along with the full range of equivalents to which the claims are entitled.

In particular, steps relative to the creation of the nonce can be realized any time before the step E3 without departing from the scope of the invention. Also decryption is a form of unlocking as, if the keystore is a file stored on a device, encryption would seem to be the only locking mechanism. If the keystore is stored in a SIM or smart card, the unlocking would be just presenting the correct passphrase.

The invention claimed is:

1. A method to access a data store, said data store having been previously locked by a user using a passphrase from a device, said method including preliminary steps of:
    requesting, by the device, a user to enter a personal code on the device;
    calculating, by the device, a first function of at least the personal code;
    sending, by the device, for storage, said first function to a server device having access to the passphrase;
when the user requests access to the data store on the device, said method further comprises:
    requesting, by the device, the user to enter the personal code,
    generating, by the device, an access code by applying said first function to at least the entered personal code;
    transmitting, by the device, to the server device, at least an identifier of the device and the access code;
    comparing, by the server device, the access code with the first function received from the device;
    when the access code is correct, returning, by the server device, the passphrase to the device;
    unlocking, by the device, the data store using the received passphrase in combination with the entered personal code.

2. The method according to claim 1, further comprising:
    before the preliminary calculation of the first function, a step of calculating and storing a checksum of the personal code;
    each time the user enters a personal code, a step of calculating the checksum of the entered personal code;
    a step of comparing the calculated checksum with the previously stored checksum,
    if there is a discrepancy, a step of displaying an error message, and,
    if the checksum is correct, processing the remaining steps of the method.

3. The method according to claim 1, further comprising preliminary steps of generating a fixed random number and of storing the fixed random number in the device, the first function being a function of the personal code and of the fixed random number.

4. The method according to claim 3, wherein the first function is a function of the sum of the personal code and the fixed random number.

5. The method according to claim 1, wherein the data store is previously encrypted and stored on the device.

6. The method according to claim 1, wherein the data store is previously stored on a smart card having locked access and linked to the device.

7. The method according to claim 1, comprising, each time the user request access to the data store, a step of determining a one-time nonce sent out to the server device with the access code.

8. The method according to claim 7, wherein the one-time nonce is generated by the server device and retrieved from the server device by the device each time the user requests access to the data store, the server device checking the nonce then received back from the device.

9. The method according to claim 7, wherein the one-time nonce is calculated in the device and linked to the previously sent one-time nonce for the server to check the sequence of one-time nonces.

10. The method according to claim 9, further comprising:
after the calculation of the access code, calculating a second function of the access code and of the nonce, sending the second function to the server device with the nonce and a step, for the server device to verify the information sent by performing the same operation as the device, using the previously stored access code and received nonce.

11. The method according to claim 1, wherein the entering of the personal code is done by secure acquisition.

12. The method according to claim 1, wherein communications between the device and the server device are secured, and the device encrypts messages using a public key of the server device.

13. The method according to claim 12, wherein the server device comprises a secure environment where the decryption of the messages occurs.

14. The method according to claim 1, wherein communications between the device and the server device are secured, and the device sends a one-time used encryption key to the server device that uses it to encrypt the sending of the passphrase.

15. The method according to claim 1, wherein the first function is a hashing function.

* * * * *